(12) United States Patent
Schay

(10) Patent No.: US 12,724,741 B2
(45) Date of Patent: Sep. 1, 2026

(54) METHODS AND SYSTEMS FOR ARCHIVING FILE SYSTEM DATA STORED BY A NETWORKED STORAGE SYSTEM

(71) Applicant: NETAPP, INC., San Jose, CA (US)

(72) Inventor: Peter Geza Schay, San Francisco, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 19/034,213

(22) Filed: Jan. 22, 2025

(65) Prior Publication Data

US 2025/0165430 A1 May 22, 2025

Related U.S. Application Data

(63) Continuation of application No. 17/706,145, filed on Mar. 28, 2022.

(51) Int. Cl.

*G06F 16/00* (2019.01)
*G06F 9/48* (2006.01)
*G06F 16/11* (2019.01)
*G06F 16/174* (2019.01)
*G06F 21/60* (2013.01)

(52) U.S. Cl.

CPC .......... *G06F 16/113* (2019.01); *G06F 9/4881* (2013.01); *G06F 16/1744* (2019.01); *G06F 21/602* (2013.01)

(58) Field of Classification Search

CPC ...... G06F 3/065; G06F 3/0665; G06F 3/0619; G06F 3/0689; G06F 3/0647; G06F 16/185; G06F 3/0683; G06F 16/188; G06F 16/1727; G06F 16/113; G06F 16/1744; G06F 9/4881; G06F 21/602

See application file for complete search history.

(56) References Cited

U.S. PATENT DOCUMENTS 7,584,239 B1 9/2009 Yan et al.
8,560,579 B1 10/2013 Gross et al.

(Continued)

OTHER PUBLICATIONS

Final Office Action mailed on Jan. 6, 2025 for U.S. Appl. No. 17/953,594, filed Sep. 27, 2022, 25 pages.

(Continued)

*Primary Examiner* — Yicun Wu

(74) *Attorney, Agent, or Firm* — Jaffery Watson Hamilton & DeSanctis LLP

(57) ABSTRACT

Methods and systems for a networked storage environment are provided. One method includes generating a first and a second batch of entries in response to scanning a source file system, each batch of entries associated with one or more directories of the source file system and indicating a path to a file associated with each entry; determining, by a first worker process, a first checksum for data associated with the first batch of entries loaded in a first buffer; appending, the first buffer contents processed by the first worker process to a first archive file; and generating an archive data structure having a manifest file storing metadata for the first batch and a second batch entries with a first checksum determined by the first worker process and a second checksum determined by a second worker process, and data from the first archive file and a second archive file.

20 Claims, 6 Drawing Sheets

(56) References Cited

U.S. PATENT DOCUMENTS

| | | | |
|---|---|---|---|
| 9,244,976 | B1 | 1/2016 | Zhang et al. |
| 9,424,273 | B2 | 8/2016 | Schay |
| 9,569,443 | B1 | 2/2017 | Van Rietschote et al. |
| 10,223,377 | B1 * | 3/2019 | Moghe .................. G06F 16/185 |
| 11,048,699 | B1 | 6/2021 | Grider et al. |
| 11,615,005 | B2 | 3/2023 | Ito et al. |
| 12,602,351 | B2 | 4/2026 | Schay |
| 2004/0044724 | A1 | 3/2004 | Bell et al. |
| 2010/0095164 | A1 * | 4/2010 | Kamei .................... G06F 3/065 714/48 |
| 2012/0166478 | A1 | 6/2012 | Das et al. |
| 2012/0268483 | A1 | 10/2012 | Soupikov et al. |
| 2014/0365440 | A1 | 12/2014 | Steiner |
| 2015/0309882 | A1 | 10/2015 | Harrison et al. |
| 2016/0357618 | A1 | 12/2016 | Degioanni et al. |
| 2017/0364357 | A1 | 12/2017 | Webber et al. |
| 2018/0075643 | A1 | 3/2018 | Sequeira et al. |
| 2019/0251468 | A1 | 8/2019 | Guillame-Bert et al. |
| 2020/0050607 | A1 | 2/2020 | Pal et al. |
| 2020/0242255 | A1 | 7/2020 | Sharma et al. |
| 2021/0117289 | A1 | 4/2021 | Lin et al. |
| 2023/0305994 | A1 | 9/2023 | Schay |
| 2023/0305999 | A1 | 9/2023 | Yeom et al. |
| 2024/0104056 | A1 | 3/2024 | Schay |

OTHER PUBLICATIONS

International Search Report and Written Opinion for Application No. PCT/US2023/013619, mailed on Jun. 1, 2023, 11 pages.

Non-Final Office Action mailed on Jul. 5, 2024 for U.S. Appl. No. 17/953,594, filed Sep. 27, 2022, 24 pages.

Notice of Allowance mailed on Sep. 25, 2024 for U.S. Appl. No. 17/706,145, filed Mar. 28, 2022, 10 pages.

Non Final Office Action mailed on Jun. 18, 2025 for U.S. Appl. No. 17/953,594, filed Sep. 27, 2022, 26 pages.

Non-Final Office Action mailed on Mar. 25, 2025 for U.S. Appl. No. 17/706,145, filed Mar. 28, 2022, 10 pages.

Final Office Action mailed on Oct. 14, 2025 for U.S. Appl. No. 17/953,594, filed Sep. 27, 2022, 29 pages.

Final Office Action mailed on Aug. 27, 2025 for U.S. Appl. No. 17/706,145, filed Mar. 28, 2022, 13 pages.

Corrected Notice of Allowance mailed on Feb. 18, 2026 for U.S. Appl. No. 17/706,145, filed Mar. 28, 2022, 05 pages.

Corrected Notice of Allowance mailed on Mar. 6, 2026 for U.S. Appl. No. 17/706,145, filed Mar. 28, 2022, 05 pages.

Notice of Allowance mailed on Jun. 16, 2026 for U.S. Appl. No. 17/953,594, filed Sep. 27, 2022, 10 pages.

* cited by examiner

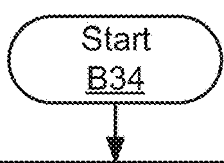

Receive, by a scanner, archiving parameters including a source file system location, encryption and/or compression instructions, parity (or ECC) parameters, maximum number of worker processes (or default), maximum data file size, archive data structure destination information, or any other parameter B36

Scan, by the scanner, the source file system by reading source file system directories, starting from a root directory to the sub directories B38

Generate, by the scanner, a batch of entries for one or more worker processes, and assign an existing, unassigned archive non-empty data file or create a new empty data file for each worker process B40

Initialize each worker process B42

Process, a batch of entries by a plurality of worker processes in parallel B44

Append, by the scanner, metadata for the processed entries to a manifest file B46

Generate, by the scanner, an archive data structure with a summary file, the manifest file and the archive data files generated by each worker process B48

METHODS AND SYSTEMS FOR ARCHIVING FILE SYSTEM DATA STORED BY A NETWORKED STORAGE SYSTEM

CROSS-REFERENCE TO RELATED APPLICATIONS

This patent application claims priority of and is a continuation of U.S. patent application Ser. No. 17/706,145, filed on Mar. 28, 2022, now issued as U.S. Pat. No. 12,602,351, the disclosure of which is incorporated herein by reference in its entirety.

TECHNICAL FIELD

The present disclosure relates to storage systems and more particularly, to archiving, verifying, extracting and updating file system data stored in a networked storage system.

BACKGROUND

Various forms of storage systems are used today. These forms include direct attached storage (DAS), network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices operating in a group of a storage sub-system. The storage devices within a storage system are typically organized as one or more groups (or arrays), wherein each group is operated as a RAID (Redundant Array of Inexpensive Disks).

Storage systems today store data for large file systems with many files/entries, e.g. in some instances millions of files. Often these files are stored by on-premise storage system's. Cloud storage is now becoming common for data storage. However, conventional systems today do not provide efficient and reliable solutions for archiving file system files, replicating the archives to cloud storage, and then verifying, extracting and updating the files from the archive data files. There is a need for efficiently generating archive data files and then verifying, extracting and updating the files at a destination, e.g., a cloud-based storage location or any other location.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 1B shows a process flow for generating an archive data structure, according to one aspect of the present disclosure;

FIG. 1C shows a process flow executed by a plurality of worker processes for generating an archive data structure, according to one aspect of the present disclosure;

DETAILED DESCRIPTION

Figure 1A:
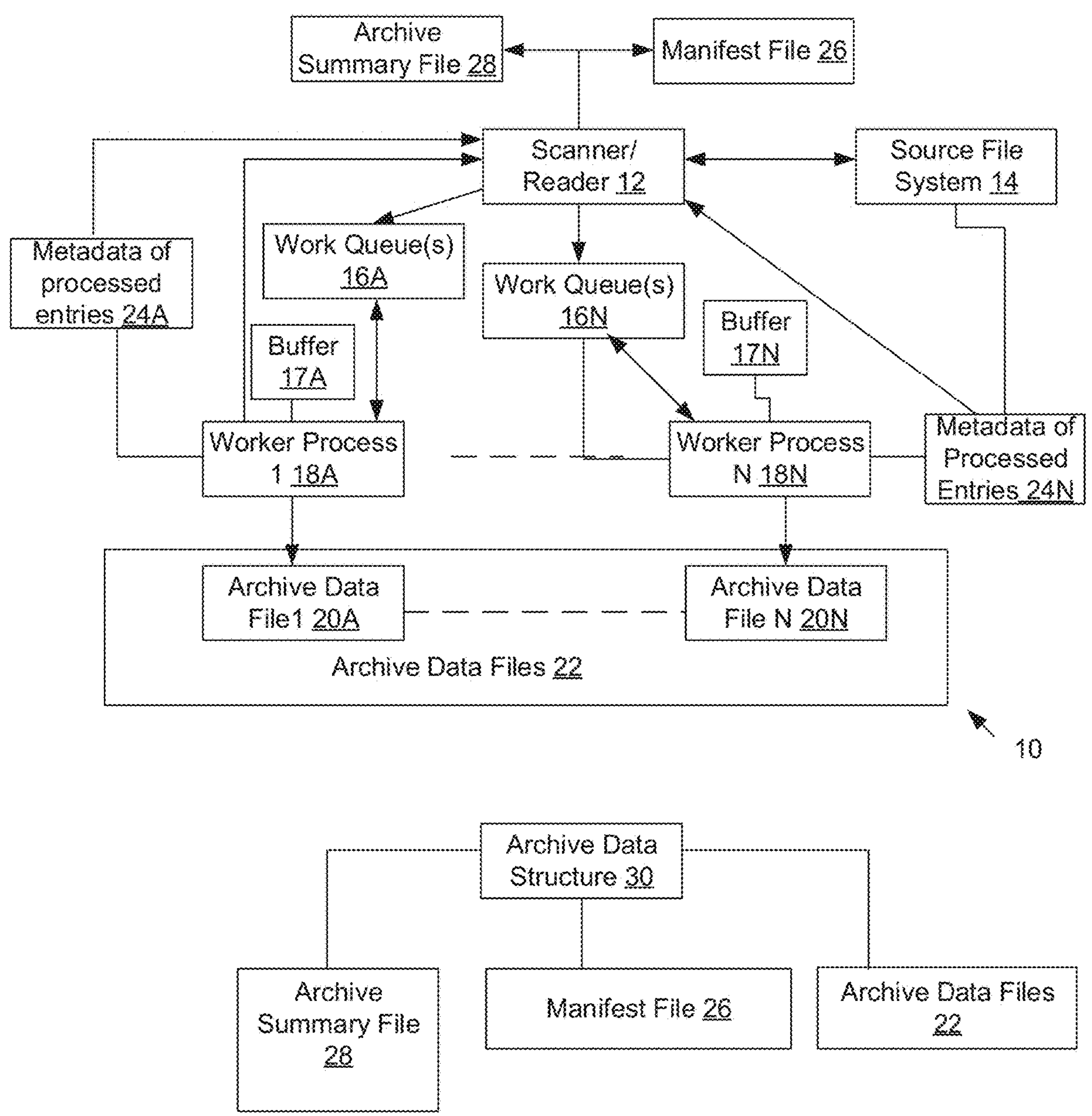
FIG. 1A shows a block diagram of a system for generating an archive data structure and extracting data files, according to one aspect of the present disclosure.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive, EEPROM (electrically erasable programmable read only memory), memory stick or any other storage device type, in accordance with the claimed subject matter.

This present disclosure provides innovative technology to efficiently pack large source filesystems in an archive data structure, comprised of a plurality of files, in a fault-tolerant manner, so that data is protected with checksums, encryption and optionally, with parity data. Typically, a source file system includes a plurality of entries, where each entry is a regular file, a directory, a symbolic link, a hard link, or a special filesystem-dependent type entry. The source file system also includes metadata attributes associated with each of the plurality of entries. The metadata includes a name of each file system entry, identifies an owner of each entry, permissions associated with each entry (e.g., read, write or both read and write access), last modification time when the file system entry was modified or any other attribute. The source file system includes data stored by one or more applications as contents of the regular file entries. The source file system may also include a tree structure extending from a single root directory. The term file as used throughout this specification includes data containers, objects, structured and unstructured data.

Conventional technology today does not provide an efficient technical solution to pack a large source file system into an archive data structure having archived data files of the source file system. Efficient packing is useful for a large source file system file, e.g., packing a 500-million-entry, 100 TiB source file system into a relatively few 500 MiB size archive files to enable efficient migration of the archive files over a network connection to a cloud storage (e.g., Amazon Web Services (AWS) Direct Connect provided by Amazon Inc, Azure Express Route provided by Microsoft Corporation or any other technique (without derogation of any third party trademarks)), safe storage in physical transport systems (e.g., using AWS Snowball service provided by Amazon Inc., Microsoft Azure Data Box provided by Microsoft Corporation or another similar service (without derogation of any third party trademarks)) as well storage at a staging location (e.g., using AWS S3, block storage provided by AWS, Azure Blob, block storage provided by Microsoft Corporation or any other storage location) before extraction and verification. The present disclosure addresses this technical need, as described below in detail.

At a high level, the innovative technology described herein enables creating an archive (also referred to as an archive data structure or an "archive set") of a large source filesystem; verifying correctness of the archive data structure's copy of the source data and metadata; transferring the archive data structure to a public cloud datacenter via a physical transport system, a network link or otherwise; staging the archive data structure in a low-cost object storage; extracting the archive data structure to a cloud storage service; reverifying the source filesystem during and after extraction in a cloud environment; and creating an update of a smaller archive data structure of source filesystem changes that occurred after the original archive data structure was created.

In one aspect, the archive data structure of a source filesystem generated from the innovative system/workflow described below in detail, includes a summary file, a manifest file, and one or more archive data files. The archive data structure duplicates contents of the source filesystem and stores extra information for efficient and reliable operations. As an example, the summary file contains information describing the archive data structure and includes checksums for the archive's data structure.

The manifest file includes metadata associated with each entry of the source file system, e.g., the name of each file and storage path indicating where data associated with each entry is stored, filesystem attributes of each entry (e.g., owner information, last access and modification times, permissions, or any other information), as well as pointers to where the source data is located in the archive data files. A pointer for a portion of data of a source file is comprised of a source offset and size of the portion, an archive datafile identifier, an offset of a compressed buffer, when applicable, and an offset of the portion of data in an uncompressed buffer. When files are small (e.g., below a threshold size), a plurality of files are packed together using the compressed buffer, and for large files (e.g., above the threshold size) the data is stored using a plurality of compressed buffers. For each non-empty source file, the manifest file includes a checksum of sequentially concatenated portions of said file's source data using an algorithm, e.g., the MD5 or any other algorithm.

In one aspect, data of each archive data file of the archive data structure is stored separately from the checksums and metadata of the manifest file. As described below in detail, the data file contents can be efficiently packed and compressed during archival, depending on the type of data (e.g., if source data is already compressed, random or encrypted, it is not compressed).

In one aspect, the innovative technology of the present disclosure includes a scanner that scans entries of a source file system (e.g., an NFS (Network File System) export or a SMB (Server Message Block) share on a storage system) and populates one or more work queues assigned to different worker processes (1-N) with a batch of entries. To generate an archive data structure, the worker processes operate in parallel to process the batch of entries from the worker queues. Data associated with the batch of entries are read by the worker processes and packed into one or more archive data files. When each worker process has packed and archived all the entries in its queue, the metadata for those entries is added to the manifest file by the scanner, as described below in detail.

The innovative workflow for archiving the source filesystem includes creating an initial summary file for an archive data structure of the source filesystem by the scanner. The initial summary file describes archiving task parameters e.g., a source filesystem location, a first staging area to store the archive data structure, information about the archiving task, including a starting date and time, and other user selected options. The scanner executes a scanning algorithm that scans the source file system from the root of the file system directory. The scanner reads directory entries and adds a batch of entries to a work queue. Entries that represent directories are added to a subdirectory queue. Concurrent worker processes read the batch of entries from the work queue (s) for processing, while the scanner's tasks asynchronously wait for processed entries by the worker processes, thereby progressing efficiently through the source file system until all the entries of the source filesystem have been queued by the scanner and processed by worker processes.

In one aspect, the worker processes are launched by the scanner for parallel processing of work queue entries, as entries are added. Each worker process is given a list of entries, that are referred to herein as a "batch" of work, to process. The scanner manages a pool of archive data files and assigns one archive data file to each worker process for its exclusive use. For source and staging systems using either NAS (network attached storage), SAN (storage area network) or HDFS (Hadoop File System) or any other cluster-accessible storage, worker processes can run on multiple systems in a cluster, to efficiently pack data into the archive data files. When a worker process finishes processing batch entries, the scanner appends the metadata of the batch entries to the manifest file.

Each worker process processes its batch of entries as follows: To process regular file entries that store application data, the worker process reads data in blocks, using implementation-dependent block size such as 256 KiB, and appends each received data block to a memory buffer that may be of a fixed size. When there are many files in the batch, the worker process issues concurrent read requests to the source file system and appends the data in the buffer as it is received. Thus, the memory buffer may contain data from multiple source files, or, for a very large source file, the buffer may contain just a portion of the source file's data contents. When a buffer is full, the data in the buffer is compressed by the worker process, encrypted and appended to the assigned archive data file by the worker process.

When an archive data file has a size limit, the worker process appending to its assigned archive data file may reach the size limit. In that case the worker process may use, e.g., an RPC (remote procedure call) to request a new archive datafile from the scanner. In response to the request, the scanner either provides a new empty datafile or a partially filled one that is not currently allocated to another worker process.

As mentioned above, the file system entries, with or without data, have metadata attributes. When each worker process finishes processing a batch of entries it sends the processed entries to the scanner, as a compressed and encrypted data structure containing the metadata for all the entries in the processed batch. The metadata for each entry, as described above, includes attributes from the source file system (e.g., a file storage path, a file name, ownership information, permissions associated with each entry, modification times of each entry, if applicable or any other attribute) and implementation-specific and/or filesystem specific information including access control lists (ACLs). For each file entry with data that was appended to one or more archive datafiles, the file entry's metadata also includes the following information about each portion of the source data (e.g., a single portion for small files and multiple portions for large files): a source offset and size of the data portion, archive datafile identifier, an offset of a compressed buffer in the datafile, and an offset of the portion in the buffer prior to compression.

For every source file with data, the worker process also computes a checksum of all sequentially concatenated portions of source data using an algorithm, e.g., the MD5 (or any other algorithm) and includes the checksum in the metadata for that entry. Thus, the source file data packed in the archive's data files are separated from the checksums and metadata stored in the manifest file. For both metadata and data, a worker process may also compute error-correcting codes (e.g., parity information) for detection and correction of errors in case of data corruption during transit to a destination.

When the scanner and worker processing is complete, the metadata from the source filesystem is stored in the manifest file. All application data in the regular files is stored in the archive datafiles using efficient packing, based on a buffer size, favorable to parallel processing and high input/output. The final summary file is written by the scanner with the original task parameters and new information such as the number of datafiles and their checksums.

In summary, as described above, the technology disclosed herein provides/enables generating separate metadata from source file system data. This enables the metadata to be used more efficiently for verification and update operations, and to process data more efficiently for all operations. Furthermore, the technology described herein efficiently computes checksums and error correcting codes and performs compression and encryption during archival at a source system, using parallel processing.

In one aspect, after the archive data structure is generated, the innovative technology disclosed herein enables efficient verification, extraction and update of the data file in the archive data structure. A master reader (similar to the scanner) reads compressed batches of entries sequentially from the manifest file and launches a worker process for each batch of entries, enabling parallel processing of the manifest file entries.

Each worker process decompresses its batch of entries, and performs verification, extraction and if applicable, update of modified file entries. For verification, a worker process compares a file path, file name, modification time, and other metadata of each entry of the source filesystem or a destination filesystem (e.g. when verifying in the cloud); optionally reads and re-checksums the file data from the source/destination file and compares that to the checksum in the manifest file.

For extraction, a worker process creates the directories and files on a destination storage system and copies the data from the archive data files by retrieving the packed buffers, decrypting and decompressing the data files. The worker process also validates checksums of the data files and may correct any corrupt data using parity from the manifest file.

For updating, a worker process identifies modified files and directories included in the archive data structure, as well as any new files and directories that may have been created after the archive data structure is generated. The worker process then repacks them into a new archive data file. In another aspect, the worker process may also pack file and directory metadata of deleted files and directories. Details of the innovative technology and various innovative workflows of the present disclosure are provided below.

System 10: FIG. 1A shows an example of a system 10 for implementing the innovative technology of the present disclosure. System 10 includes a scanner 12 that has access to a source file system 14. It is noteworthy that scanner 12 of FIG. 1A may also be referred to as "reader 12" that is used during an extraction process, as described below with respect to FIG. 1D. The source file system 14 may be a NFS, SMB or any other file system type maintained by a storage system operating system (e.g., 124/140, FIG. 2) executed in a storage system (e.g., 120, FIG. 2) or by a cloud based storage operating system (e.g., 140, FIG. 2). The source file system 14 keeps track of a directory structure for the data stored in storage devices. The source file system 14 logically organizes stored information as a hierarchical structure for stored files/directories/objects. Each "on-disk" file may be implemented as a set of data blocks configured to store information, such as text, whereas a directory may be implemented as a specially formatted file in which other files and directories are stored. Data blocks that store the information are organized within a volume block number (VBN) space that is maintained by a storage operating system. As an example, the source file system 14 uses an inode, a data structure, to store information, such as metadata, about a file, whereas data blocks are structures used to store the actual data for the file. The information in an inode may include, e.g., ownership of the file, file modification time, access permission for the file, size of the file, file type and references to locations of the data blocks for the file. The references to the locations of the file data are provided by pointers, which may further reference indirect blocks (e.g., L1 blocks) that, in turn, reference the data blocks (e.g., L0 blocks), depending upon the amount of data in the file.

In one aspect, scanner 12 scans the source file system 14 entries to generate a batch of entries. Each entry is associated with a file, directory, symbolic link or any other type of entry and includes a path indicating where in the source filesystem the entry is located. The scanner 12 places the batch of entries in one or more work queues 16A-16N (may also be referred to as work queue 16 or worker queues 16). Each work queue may be assigned to a worker process 18A-18N (may also be referred to as a worker process 18 or worker processes 18). Each worker process 18, preferably operating in parallel, accesses the batch of entries and processes them, as disclosed below in detail. Each worker process 18 reads the data associated with each non-empty source entry and temporarily stores the data in an assigned memory buffer 17A-17N (also referred to as memory buffer 17 or memory buffers 17). Each worker process 18 generates the checksum for the data in the assigned memory buffer 17, compresses the data and/or encrypts the data. Optionally, each worker process 18 may also generate parity data and error correction codes (ECC) to correct any data that in the future, may become corrupted during transit to a destination such as a cloud storage service. The metadata 24A-24N (may also be referred to as metadata 24) of the processed entries is provided to the scanner 12 that generates a manifest file 26.

Each worker process 18 is assigned an archive data file 20A-20N (may also be referred to as an archive data file 20 or archive data files 20) (collectively shown as archive data files 22), where processed entries are efficiently packed by each worker process 18. When an assigned archive data file 20 reaches a threshold value (e.g., becomes 90% full), then the scanner 12 assigns another archive data file that may not have reached the threshold value, or a new archive data file is created. Once the batch of entries are processed by each worker process 18, the scanner 12 generates an archive summary file 28 for an archive data structure 30 that includes the archive summary file 28, the manifest file 26 and the archive data files 22 that may be compressed and/or encrypted.

Process Flows: FIG. 1B shows a process 32 for utilizing worker processes 18 in parallel to generate the archive data structure 30 with the summary file 28, manifest file 26 and archive data files 22, according to one aspect of the present disclosure. Process 32 begins in block B34, when the source file system 14 has been operational and has stored information at one or more storage devices. The data may be stored by an on-premise storage system (e.g., 120, FIG. 2), a cloud storage 128 or both the storage system 120 and cloud storage 128. The stored information includes directories, sub-directories, application data or any other information.

In block B36, the scanner 12 receives archiving parameters for archiving the source file system 14 entries. The parameters include a location where the source file system 14 stores data, instructions for compressing data, instructions for encrypting information, parity parameters, if specified, a maximum number of worker processes 18 that can be used, a maximum size for each archive data file, a destination format where the archive data structure 30 will be located or any other information. It is noteworthy that the scanner 12 is provided with some or all the parameters, and no specific parameter is intended to limit the scope of this disclosure.

In block B38, the scanner 12 reads the source file system directories, starting from a root directory to all sub-directories. Based on the directories of the source file system 14, in block B40, the scanner 12, generates a batch of entries as a workload for one or more worker processes 18. Each batch entry indicates the file storage path of the data associated with the entry. The batch of entries are temporarily stored in the worker queues 16. As mentioned above, each worker process 18 may be assigned a designated worker queue 16. The scanner 12 also assigns an archive file 20 to each worker process. The archive file 20 may already exist, but if none are available, a new archive data file 20 is assigned to each worker process. Thereafter, the scanner initializes each worker process 18 in block B42.

In block B44, each worker process 18 processes the batch of entries from the work queues 16. Each worker process 18 also determines the checksum for the data associated with each entry. The metadata for each processed entry is provided to the scanner 12. Details regarding block B44 are described below with respect to FIG. 1C.

In block B46, the scanner 12 adds metadata of the processed entries to the manifest file 26. As an example, the manifest file 26 includes the name of each source file, source file ownership information, permissions associated with each file entry, modification times, checksum for data associated with each entry, a source offset, size of the source file, an offset indicating the location of the file in the archive data structure 30 or any other information.

In block B48, after the batch entries are processed, preferably in parallel by the plurality of worker processes 18, the scanner 12 generates the archive data structure 30 with the summary file 28, the manifest file 26 and the archive data files 22. It is noteworthy that the checksum for the source file data stored in the archive data files is stored in the manifest file 26, which makes it easier to perform verification, as described below with respect to FIG. 1D. The summary file 28 describes the archive data structure 30 and includes a checksum for each data file in the archive data structure 30.

Figure 1C:
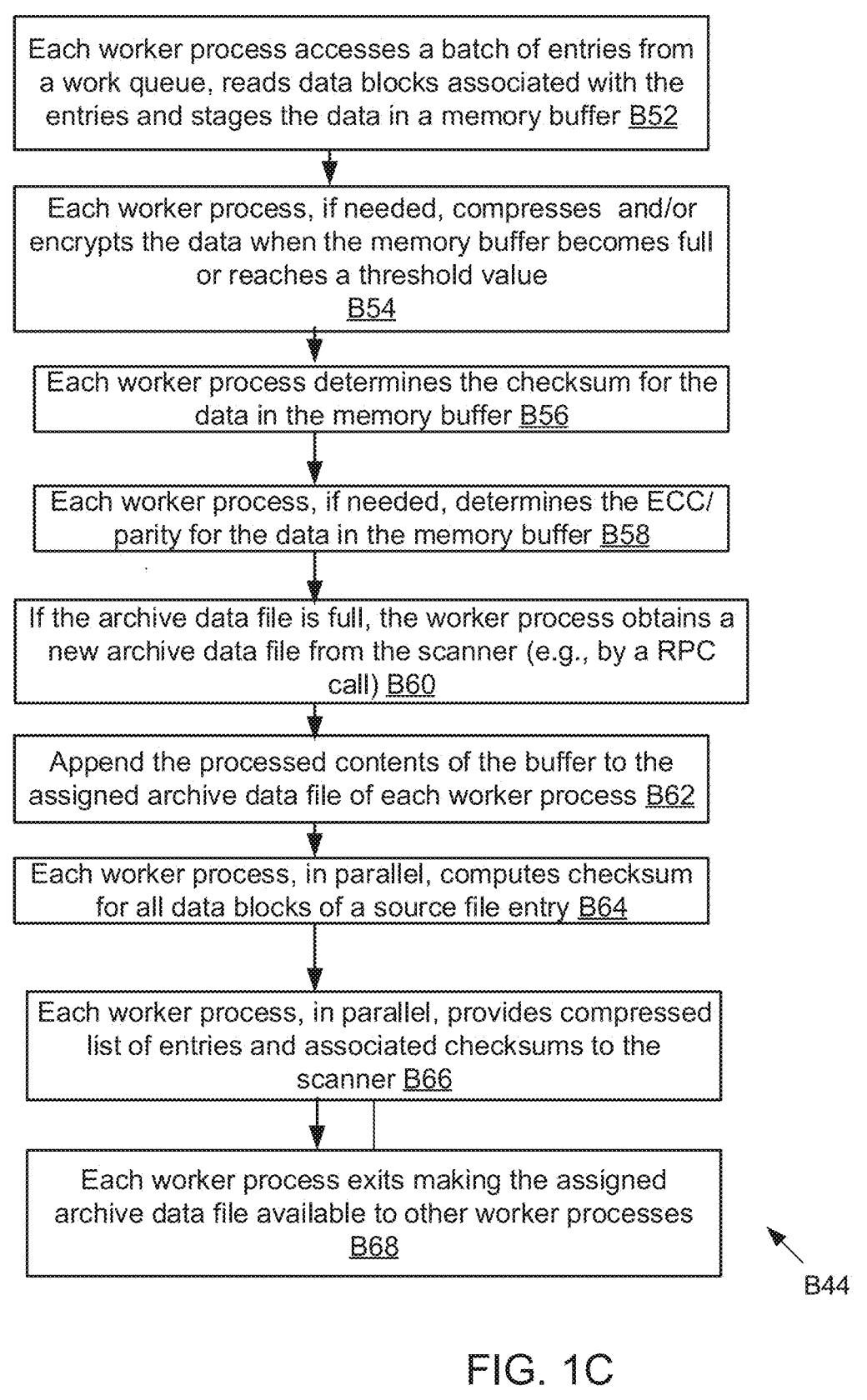

FIG. 1C shows details of process block B44, according to one aspect of the present disclosure. Process block B44 is executed by the plurality of worker process 18. In one aspect, in block B52, each worker process 18 accesses an assigned worker queue 16 to access a batch of entries generated by the scanner 12. Each worker process 18 reads the data blocks associated with the file path indicated by each entry. The read data is temporarily staged in one of the memory buffers 17 assigned to each worker process 18.

In block B54, each worker process 18 compresses the data in the buffer, based on the archiving parameters provided to the scanner 12 in block B36 of FIG. 1B. Furthermore, each worker process 18 encrypts the data in the buffer, based on the archiving parameters provided to the scanner 12 in block B36 of FIG. 1B. It is noteworthy that the adaptive aspects of the present disclosure are not limited to compressing or encrypting the data.

In block B56, each worker process 18 determines the checksum for the data in the buffer. Furthermore, in block B58, if specified in the archiving parameters, each worker process 18 determines parity data/error correction code ("ECC") for the data in the memory buffer 17. The parity/ECC is used to reconstruct data upon extraction, as described below in detail.

In block B60, in response to an archive data file 20 being full for a worker process 18, a new archive data file 20 is obtained from the scanner 12, e.g., via an RPC call. The new archive data file may be a non-empty existing archive data file that is not full, or a new archive data file created by the scanner 12.

In block B62, each worker process 18 appends the processed contents of each memory buffer to the assigned archive data files 20. Thereafter, in block B64, each worker process 18 determines the checksums of each source file entry. The list of entries and the associated checksums are provided to the scanner 12 in block B66. Thereafter, each worker process exits, making each archive data file available to the worker process in block B68.

In one aspect, methods and systems for a networked storage environment are provided. One method includes generating (B40, FIG. 1B, by a processor, a first batch of entries and a second batch of entries in response to scanning a source file system (e.g., 14, FIG. 1), each of the first and second batch of entries associated with one or more directories of the source file system and indicating a path to a file associated with each entry; determining (e.g., B44, FIG. 1B), by a first worker process (e.g., 18A, FIG. 1A), a first checksum for data associated with the first batch of entries loaded in a first buffer (e.g., 17A) assigned to the first worker process for processing the first batch of entries; appending (e.g., B62, FIG. 1C), by the first worker process, the first buffer contents processed by the first worker process to a first archive file (e.g., 20A, FIG. 1A) assigned to the first worker process; determining (e.g., B44, FIG. 1B), by the second worker process (e.g., 18N, FIG. 1A), in parallel with the first worker process, a second checksum for data associated with the second batch of entries loaded in a second buffer (e.g., 17N, FIG. 1N) assigned to the second worker process for processing the second batch of entries; appending (e.g., B62, FIG. 1C), by the second worker process, in parallel with the first worker process, the second buffer contents processed by the second worker process to a second archive file assigned to the first worker process; and generating (B48, FIG. 1B), by the processor, an archive data structure (e.g., 30, FIG. 1A) having a manifest file (e.g., 26, FIG. 1A) storing metadata for the first batch and the second batch entries with the first and second checksum determined by the first worker process and the second worker process, and data from the first archive file and the second archive file.

Figure 1D:
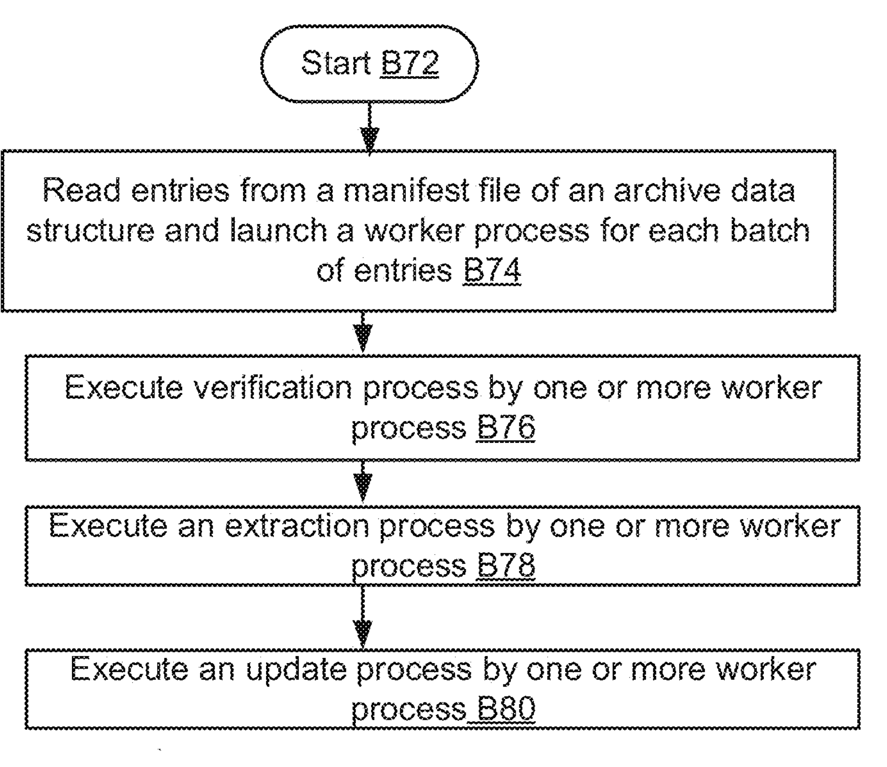
FIG. 1D shows a process flow for verifying, extracting and updating data files of an archive data structure, according to one aspect of the present disclosure.
Figure 2:
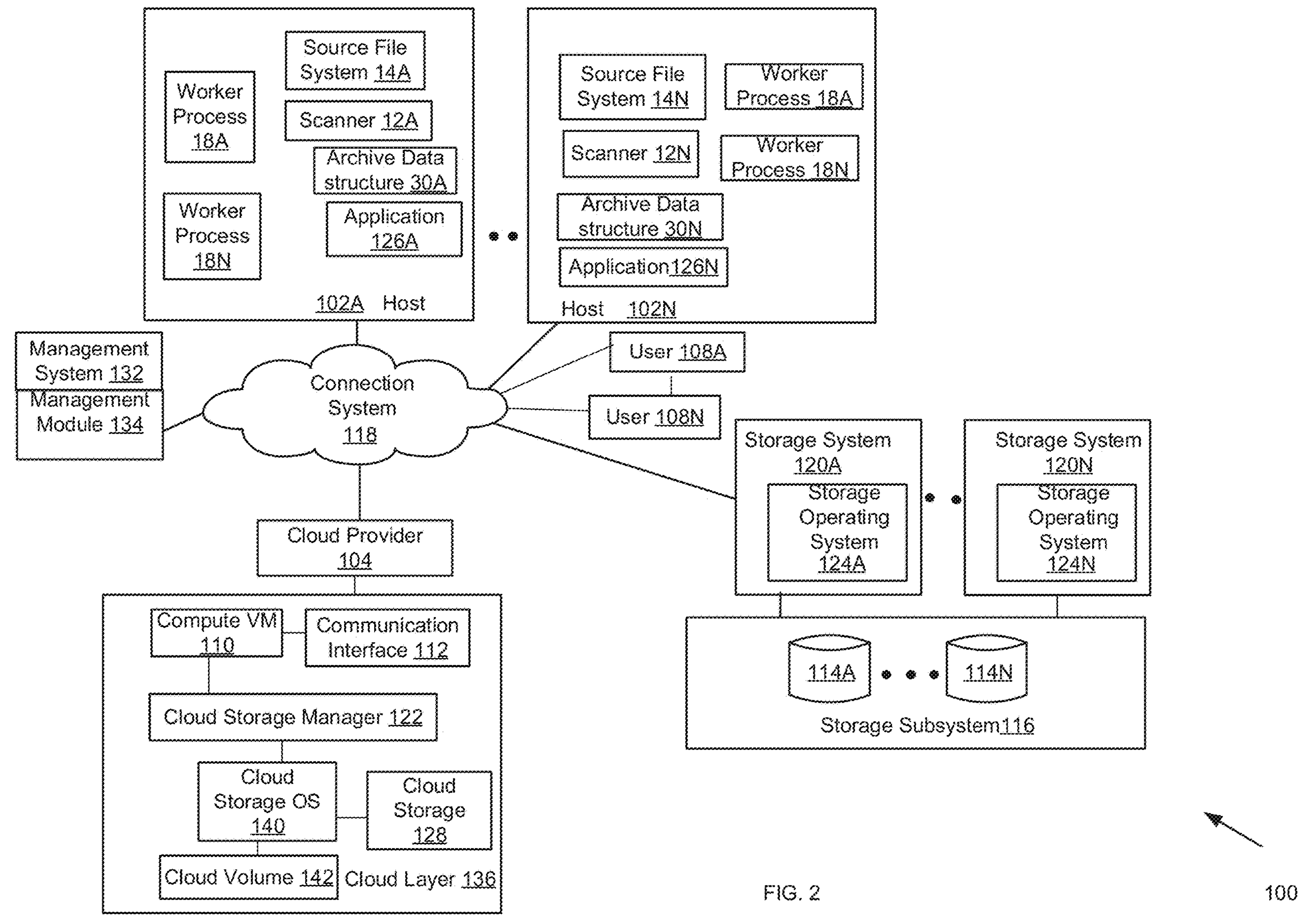
FIG. 2 shows a block diagram of an operating environment, used according to one aspect of the present disclosure.

FIG. 1D shows a process 70 for verifying, extracting and/or updating the archive data structure files 20 generated using the process flows of FIGS. 1B and 1C. Process 70 may be performed at a cloud staging area using cloud storage or any other location including an on-premise storage system 120 (FIG. 2). Process 70 begins in block B72 when the archive data structure 30 has been created.

In block B74, the scanner 12, operating as a reader, reads the entries in the manifest file 26 and generates a batch of entries for one or more worker queues 16. The entries in the manifest file 26 may be compressed. A worker process 18 is launched for each batch of entries.

In block B76, each worker process 18, operating as a verification worker process performs a verification process. Each verification worker process 18 compares a file path, file name, modification time, and other metadata of each entry to the source filesystem or a destination filesystem (e.g. when verifying in the cloud). Optionally, each worker process reads and re-checksums the file data from the source/destination file and compares that to the checksum in the manifest file 26.

In block B78, each worker process 18, operating as an extraction worker process creates directories and files on a destination storage system and copies the data from the archive data files 22 by retrieving the packed memory buffers 17, decrypting and decompressing the data files. Each worker process 18 also validates checksums of the data files and may correct any corrupt data using parity.

In block B80, each worker process 18, identifies modified files and directories included in the archive data structure 30, as well as any new files and directories that may have been created after the archive data structure is generated. In one aspect, each worker process 18 obtains the identity of the modified files from the scanner/reader 12 that has access to the source file system 14. The source file system 14 maintains information regarding modified files, after the archive data structure 30 is generated. Each worker process 18 then repacks the modified files into a new archive data file 20. In another aspect, each worker process may also pack file and directory metadata of deleted files and directories.

In one aspect, the foregoing innovative technology archives, verifies, extracts and updates the contents (e.g., path and metadata information for all files, directories, other entry types and file data for all files) of a filesystem. The source file system and a destination file system are separate. The archive data structure with the summary file, the manifest file and the archive data files can be easily transferred to a reliable staging area between the source and the destination system. The archive data files can be verified efficiently both at a destination system and a source system. After an initial transfer of the archive data structure, any incremental updates can be applied efficiently. Because multiple worker processes 18 and the scanner 12 can operate in parallel, archival, verification, extraction and update are executed efficiently.

The following provides a list of commands for executing the process blocks of FIGS. 1B-1D. The term "xpack", as used herein, includes the scanner/reader 12 and the worker processes 18. The term "manifest" refers to the manifest file 26.

archive: Pack a source tree into datafiles on one or more targets
- xpack archive -n name [options] source target [target2, . . . ]
  - -name, -n: user-defined archive id
  - -max #[MGT]: target datafile maximum size (e.g., default: 1T)
  - -compress 0-3: Compression level from 0=fastest to 3=smallest (e.g., default: 1)
  - -encrypt key or @ENVVAR: encryption key for data and manifest
  - -match: filtered archive
  - -parallel #: Maximum concurrent worker processes (e.g., default: 8)
  - -tree: tree and file generation parameters
  - -no_test: skip automatic extract test after archive
- extract: Unpack a source archive to a destination file server
- xpack extract -n name [options] staging area destination
  - -name, -n: user-defined archive id
  - -decrypt key or @ENVVAR: decryption key
  - -parallel #: Maximum concurrent worker processes (e.g., default: 8)
  - -match filter: extract files matching the filter
- extract test: Validate decryption, decompression and checksums
- xpack extract test -n name [options] staging area (no target)
  - -name, -n: user-defined archive id
  - -decrypt key or @ENVVAR: decryption key
    - -match filter: extract files matching the filter
  - -parallel #: Maximum concurrent worker processes (e.g., default: 8)
- remove: Remove an archive's metadata and datafiles
- xpack remove -n name [-y]
  - -name, -n: user-defined archive id
    - -y: remove without asking for confirmation
- review: List or summarize the files and directories in a manifest
- xpack review -n name [-s staging area][options]
  - -name, -n: user-defined archive id
  - -stage, -s: read the manifest from a staging area
  - -decrypt key or @ENVVAR: key to read an encrypted manifest
  - -l: long format listing
  - -fmt string expression: custom formatter for list entries
  - -match filter: Process files and directories that match the filter
  - -stats, -csv, -html: Tree statistics report formats
  - -parallel #: for huge manifests, more processes can speed up review compare: Compare source and destination file trees
xpack compare [options] source destination
-match filter: Process files and directories that match the filter
-parallel #: Maximum concurrent worker processes (default: 8)
-l: for each discrepancy, list the source with the destination fields that differ
compare manifest: Compare a manifest to the archive source or the extract destination
xpack compare manifest [options]-n name -s staging area destination
-name, -n: user-defined archive id
-decrypt key or @ENVVAR: decryption key
-stage, -s: look in a staging area instead of the catalog
-parallel #: Maximum concurrent worker processes (default: 8)
-l: for each discrepancy, list the source with the destination fields that differ
scan: list or summarize a file tree
xpack scan [options] source
-l: long format listing
-fmt string expression: custom formatter for list entries
-stats, -csv, -html: Tree statistics report formats
-match filter: Process files and directories that match the filter
-du: Summarize space usage of each directory including subdirectories
-tree: tree and file generation parameters
-parallel #: Maximum concurrent worker processes (default: 8)
show: List archives in the catalog or a staging area
xpack show [-s staging area]
-stage, -s: look in a staging area instead of the catalog
-l: include more information in the archive list
-csv, -html: job summary format (default is console human-readable)

System 100: FIG. 2 shows an example of a networked operating environment 100 (also referred to as system 100) used according to one aspect of the present disclosure. As an example, system 100 may include a plurality of storage systems 120A-120N (may also be referred to as storage server/storage servers/storage controller/storage controllers 120, and also referred to as an "on-premise" storage system 120) executing a storage operating system 124A-124N (may also be referred to as storage operating system 124 or storage operating systems 124), a plurality of computing systems 102A-102N (shown as host 102, 102A-102N and may also be referred to as a "host system 102", "host systems 102", "server 102" or "servers 102") and user systems 108A-108N (may also be referred to as "user system 108," "user systems 108," "client system 108" or "client systems 108") that may access storage space provided by a cloud layer 136 and/or a storage-subsystem 116 managed by the storage systems 120 via a connection system 118 such as a local area network (LAN), wide area network (WAN), the Internet and others. The storage-subsystem 116 includes a plurality of storage devices 114A-114N (may also be referred to as storage device/storage devices/disk/disks 114). It is noteworthy that the term "disk" as used herein is intended to mean any storage device/space and not to limit the adaptive aspects to any particular type of storage device, for example, hard disks.

In one aspect, the host systems 102 execute the scanner 12, shown as 12A-12N that generates the archive data structure 30, shown as 30A-30N, described above in detail. The worker processes 18A-18N operate in parallel to archive, verify, extract and update the source file system 14 entries, as described above. The archive data container 30A may be migrated to the cloud layer 136, described below or the storage system 120. In one aspect, the cloud layer 136 may be a staging area for the archive data container 30.

In one aspect, the storage system 120 uses the storage operating system 124 to store and retrieve data from the storage sub-system 116 by accessing the storage devices 114. Data is stored and accessed using read and write requests that are also referred to as input/output (I/O) requests. The storage devices 114 may be organized as one or more RAID groups. The various aspects disclosed herein are not limited to any storage device type or storage device configuration.

In one aspect, system 100 also includes the cloud layer 136 having a cloud storage manager (may also be referred to as "cloud manager") 122, and a cloud storage operating system (may also be referred to as "Cloud Storage OS") 140 having access to cloud storage 128. The cloud storage manager 122 enables configuration and management of storage resources. The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud specific services.

As an example, a cloud provider 104, provides access to the cloud layer 136 and its components via a communication interface 112. A non-limiting example of the cloud layer 136 is a cloud platform, e.g., Amazon Web Services ("AWS") provided by Amazon Inc., Azure provided by Microsoft Corporation, Google Cloud Platform provided by Alphabet Inc. (without derogation of any trademark rights of Amazon Inc., Microsoft Corporation or Alphabet Inc.), or any other cloud platform. In one aspect, communication interface 112 includes hardware, circuitry, logic and firmware to receive and transmit information using one or more protocols. As an example, the cloud layer 136 can be configured as a virtual private cloud (VPC), a logically isolated section of a cloud infrastructure that simulates an on-premises data center with the on-premise, storage system 120.

In one aspect, the cloud manager 122 is provided as a software application running on a computing device or within a virtual machine for configuring, protecting and managing storage objects. In one aspect, the cloud manager 122 enables access to a storage service (e.g., backup, restore, cloning or any other storage related service) from a "micro-service" made available from the cloud layer 136. In one aspect, the cloud manager 122 stores user information including a user identifier, a network domain for a user device, a user account identifier, or any other information to enable access to storage from the cloud layer 136.

Software applications for cloud-based systems are typically built using "containers," which may also be referred to as micro-services. Kubernetes is an open-source software platform for deploying, managing and scaling containers including the cloud storage OS 140, and the cloud manager 122. Azure is a cloud computing platform provided by Microsoft Corporation (without derogation of any third-party trademark rights) for building, testing, deploying, and managing applications and services including the cloud storage OS 140, the and cloud manager 122. Azure Kubernetes Service enables deployment of a production ready Kubernetes cluster in the Azure cloud for executing the cloud storage OS 140, and the cloud manager 122. It is noteworthy that the adaptive aspects of the present disclosure are not limited to any specific cloud platform.

The term micro-service as used herein denotes computing technology for providing a specific functionality in system 100 via the cloud layer 136. As an example, the cloud storage OS 140, and the cloud manager 122 are micro-services, deployed as containers (e.g., "Docker" containers), stateless in nature, may be exposed as a REST (representational state transfer) application programming interface (API) and are discoverable by other services. Docker is a software framework for building and running micro-services using the Linux operating system kernel (without derogation of any third-party trademark rights). As an example, when implemented as docker containers, docker micro-service code for the cloud storage OS 140, and the cloud manager 122 is packaged as a "Docker image file". A Docker container for the cloud storage OS 140, and the cloud manager 122 is initialized using an associated image file. A Docker container is an active or running instantiation of a Docker image. Each Docker container provides isolation and resembles a lightweight virtual machine. It is noteworthy that many Docker containers can run simultaneously in a same Linux based computing system. It is noteworthy that although a single block is shown for the cloud manager 122 and the cloud storage OS 140, multiple instances of each micro-service (i.e., the cloud manager 122 and the cloud storage OS 140) can be executed at any given time to accommodate multiple user systems 108.

In one aspect, the cloud manager 122 and the cloud storage OS 140 can be deployed from an elastic container registry (ECR). As an example, ECR is provided by AWS (without derogation of any third-party trademark rights) and is a managed container registry that stores, manages, and deploys container images. The various aspects described herein are not limited to the Linux kernel or using the Docker container framework.

An example of the cloud storage OS 140 includes the "CLOUD VOLUMES ONTAP" provided by NetApp Inc., the assignee of this application. (without derogation of any trademark rights) The cloud storage OS 140 is a software defined version of a storage operating system 124 executed within the cloud layer 136 or accessible to the cloud layer 136 to provide storage and storage management options that are available via the storage system 120. The cloud storage OS 140 has access to cloud storage 128, which may include block-based, persistent storage that is local to the cloud storage OS 140 and object-based storage that may be remote to the cloud storage OS 140.

In another aspect, in addition to cloud storage OS 140, a cloud-based storage service is made available from the cloud layer 136 to present storage volumes (shown as cloud volume 142). An example of the cloud-based storage service is the "Cloud Volume Service," provided by NetApp Inc. (without derogation of any trademark rights). The term volume or cloud volume (used interchangeably throughout this specification) means a logical object, also referred to as a storage object, configured to store data files (or data containers or data objects), scripts, word processing documents, executable programs, and any other type of structured or unstructured data. From the perspective of a user system 108, each cloud volume can appear to be a single storage drive. However, each cloud volume can represent the storage space in one storage device, an aggregate of some or all the storage space in multiple storage devices, a RAID group, or any other suitable set of storage space. The various aspects of the present disclosure may include both the Cloud storage OS 140 and the cloud volume service or either one of them.

As an example, user systems 108 are computing devices that can access storage space at the storage system 120 via the connection system 118 or from the cloud layer 136 presented by the cloud provider 104 or any other entity. The user systems 108 can also access computing resources, as a virtual machine ("VM") (e.g., compute VM 110) via the cloud layer 136. A user may be the entire system of a company, a department, a project unit or any other entity. Each user system is uniquely identified and optionally, may be a part of a logical structure called a storage tenant (not shown). The storage tenant represents a set of users (may also be referred to as storage consumers) for the cloud provider 104 that provides access to cloud-based storage and/or compute resources (e.g., 110) via the cloud layer 136 and/or storage managed by the storage system 120.

In one aspect, host systems 102 are configured to also execute a plurality of processor-executable applications 126A-126N (may also be referred to as "application 126" or "applications 126"), for example, a database application, an email server, and others. These applications may be executed in different operating environments, for example, a virtual machine environment, Windows, Solaris, Unix (without derogation of any third-party rights) and others. The applications 126 use storage system 120 or cloud storage 128 to store information at storage devices. Although hosts 102 are shown as stand-alone computing devices, they may be made available from the cloud layer 136 as compute nodes executing applications 126 within VMs (shown as compute VM 110).

Each host system 102 interfaces with a management module 134 of a management system 132 for generating archiving parameters described above with respect to FIG. 1B, managing backups, restore, cloning and other operations for the storage system 120. The management module 134 is used for managing and configuring various elements of system 100. Management system 132 may include one or more computing systems for managing and configuring the various elements. Although the management system 132 with the management module 134 is shown as a stand-alone module, it may be implemented with other applications, for example, within a virtual machine environment. Furthermore, the management system 132 and the management module 134 may also be referred to interchangeably throughout this specification.

In one aspect, the storage system 120 provides a set of storage volumes directly to host systems 102 via the connection system 118. In another aspect, the storage volumes are presented by the cloud storage OS 140, and in that context a storage volume is referred to as a cloud volume (e.g., 142). The storage operating system 124/cloud storage OS 140 present or export data stored at storage devices 114/cloud storage 128 as a volume (or a logical unit number (LUN) for storage area network ("SAN") based storage).

The storage operating system 124/cloud storage OS 140 are used to store and manage information at storage devices 114/cloud storage 128 based on a request generated by application 126, user 108 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests are sent over connection system 118 to the storage system 120 or the cloud storage OS 140, based on the request. Storage system 120/cloud storage OS 140 receives the I/O requests, issues one or more I/O commands to storage devices 114/cloud storage 128 to read or write data on behalf of the host system 102 and issues a response containing the requested data over the network 118 to the respective host system 102.

Although storage system 120 is shown as a stand-alone system, i.e., a non-cluster-based system, in another aspect, storage system 120 may have a distributed architecture; for example, a cluster-based system that may include a separate network module and storage module. Briefly, the network module is used to communicate with host systems 102, while the storage module is used to communicate with the storage devices 114.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

In one aspect, the storage system 120 (or the cloud storage OS 140) can be organized into any suitable number of virtual servers (may also be referred to as "VServers" or virtual storage machines), in which each VServer represents a single storage system namespace with separate network access. Each VServer has a specific client domain and a security domain that are separate from the client and security domains of other VServers. Moreover, each VServer can span one or more physical nodes, each of which can hold storage associated with one or more VServers. User systems 108/host 102 can access the data on a VServer from any node of the clustered system, through the virtual interface associated with that VServer. It is noteworthy that the aspects described herein are not limited to the use of VServers.

As an example, one or more of the host systems (for example, 102A-102N) or a compute resource (not shown) of the cloud layer 136 may execute a VM environment where a physical resource is time-shared among a plurality of independently operating processor executable VMs (including compute VM 110). Each VM may function as a self-contained platform, running its own operating system (OS) and computer executable, application software. The computer executable instructions running in a VM may also be collectively referred to herein as "guest software." In addition, resources available within the VM may also be referred to herein as "guest resources."

The guest software expects to operate as if it were running on a dedicated computer rather than in a VM. That is, the guest software expects to control various events and have access to hardware resources on a physical computing system (may also be referred to as a host system) which may also be referred to herein as "host hardware resources". The host hardware resource may include one or more processors, resources resident on the processors (e.g., control registers, caches, and others), memory (instructions residing in memory, e.g., descriptor tables), and other resources (e.g., input/output devices, host attached storage, network attached storage or other like storage) that reside in a physical machine or are coupled to the host system.

Figure 3:
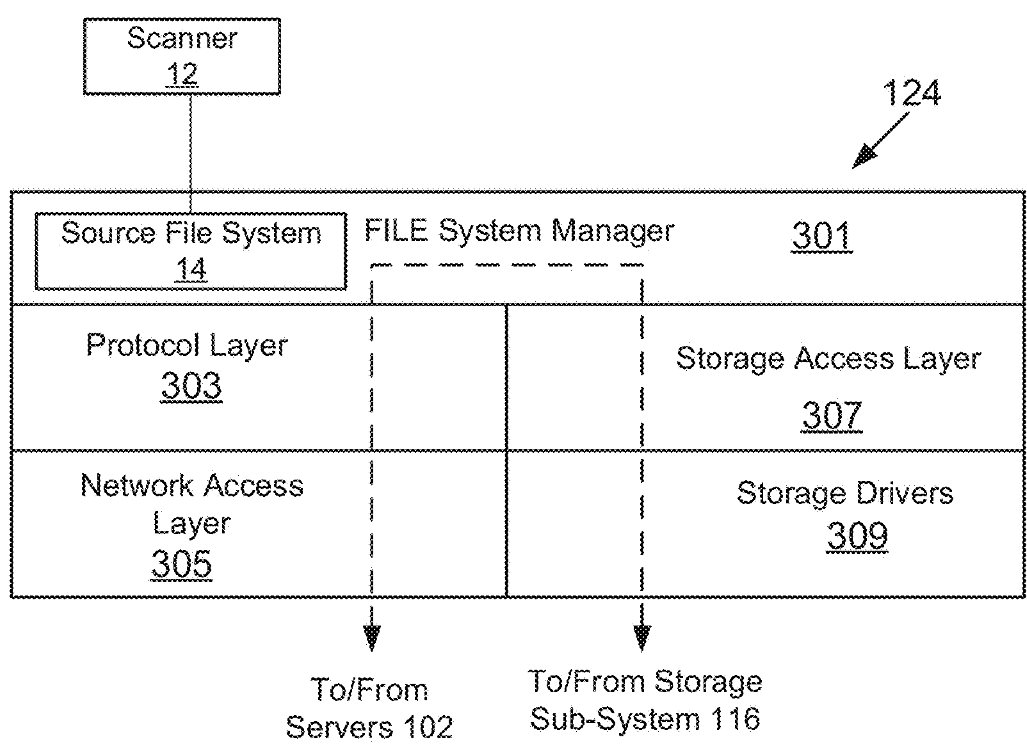
FIG. 3 shows an example of a storage operating system, used according to one aspect of the present disclosure.

Storage Operating System: FIG. 3 illustrates a generic example of the storage operating system 124 executed by the storage system 120, according to one aspect of the present disclosure. As an example, operating system 124/36 may include several modules, or "layers". These layers include a file system manager 301 that keeps track of a directory structure (hierarchy) of the data stored in storage devices and manages read/write operations, i.e., executes read/write operations on storage devices in response to host system 102 requests. In one aspect, the source file system 14 is managed by the file system manager 301 and accessible to scanner 12.

The storage operating system 124 may also include a protocol layer 303 and an associated network access layer 305, to allow storage system 120 to communicate over a network with other systems, such as host system 102, and management system 132. Protocol layer 303 may implement one or more of various higher-level network protocols, such as NFS, CIFS, S3, Hypertext Transfer Protocol (HTTP), TCP/IP and others.

Network access layer 305 may include one or more drivers, which implement one or more lower-level protocols to communicate over the network, such as Ethernet. Interactions between host systems 102 and the storage subsystem 116 are illustrated schematically as a path, which illustrates the flow of data through storage operating system 124.

The storage operating system 124 may also include a storage access layer 307 and an associated storage driver layer 309 to communicate with a storage device 114. The storage access layer 307 may implement a higher-level disk storage protocol, such as RAID layer while the storage driver layer 309 may implement a lower-level storage device access protocol, such as the NVMe protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems.

Figure 4:
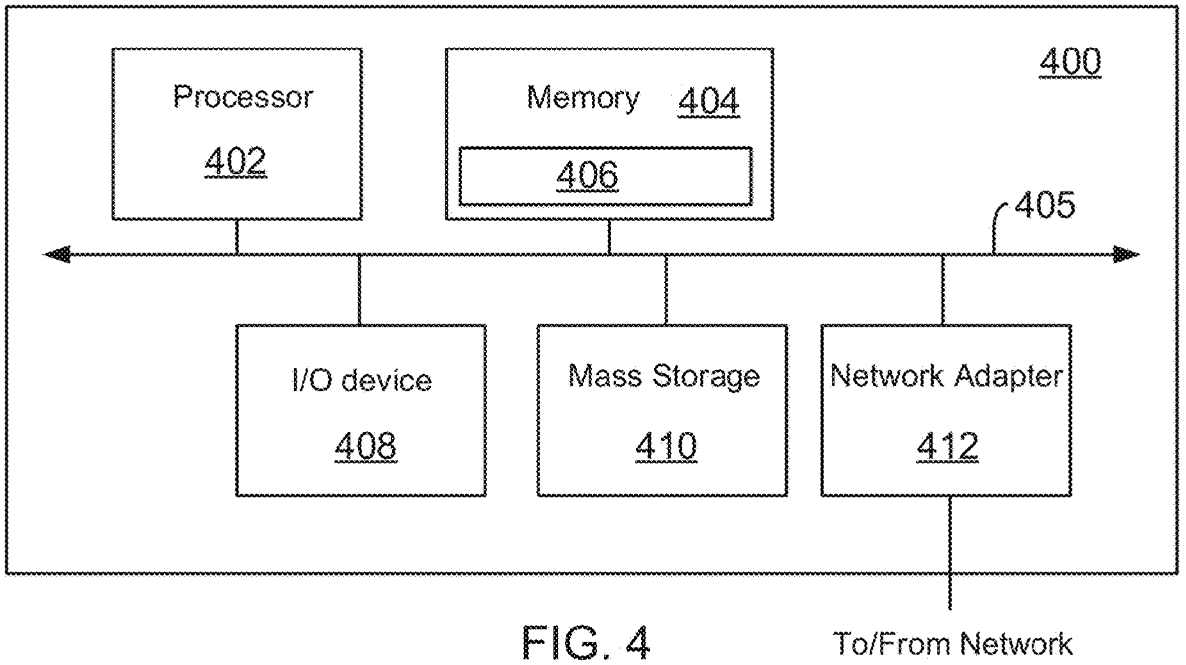
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent the storage system 120, the management system 132, host systems 102, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for executing the process blocks of FIGS. 1B-1D.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, methods and apparatus for archiving, verifying, extracting and updating source file system have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

reading, by a scanner, entries in a manifest file of an archive data structure to generate at least one batch of entries for at least one worker process, the archive data structure including the manifest file and packed archive data files archived from a source file system, the archive data structure including checksums for the archive data files in the archive data structure;

comparing, by each worker process, metadata of each entry of a particular generated batch of entries to a destination file system to verify the particular batch of entries;

reading and re-checksumming data from a target file of the destination file system to produce a new checksum and comparing the new checksum to the respective checksum from the archive data structure; and copying, by each worker process, data from archive data files of the archive data structure associated with the particular batch of entries to directories and files on the destination file system to extract the archive data files to the destination file system.

2. The method of claim 1, further comprising:

identifying, by each worker process, modified files and directories included in the archive data structure associated with the particular batch of entries; and repacking, by each worker process, the modified files into a new archive data file of the archive data structure.

3. The method of claim 1, wherein the entries in the manifest file of the archive data structure are compressed.

4. The method of claim 1, further comprising launching a worker process for each batch of entries that is generated.

5. The method of claim 1, wherein the metadata of each entry includes a file path and a file name.

6. The method of claim 1, wherein copying the data from the archive data files to the destination file system includes decrypting and decompressing the archive data files.

7. The method of claim 1, wherein copying the data from the archive data files to the destination file system further includes validating checksums of the archive data files and correcting any corrupt data using parity.

8. The method of claim 1, wherein the archive data structure includes a summary file with a checksum for each archive data file in the archive data structure.

9. A non-transitory computer-readable medium having stored thereon instructions for performing a method comprising executable code which when executed by at least one processor, causes the at least one processor to:

read, by a scanner, entries in a manifest file of an archive data structure to generate at least one batch of entries for at least one worker process, the archive data structure including the manifest file and packed archive data files archived from a source file system, the archive data structure including checksums for the archive data files in the archive data structure;

compare, by each worker process, metadata of each entry of a particular generated batch of entries to a destination file system to verify the particular batch of entries;

read and re-checksum data from a target file of the destination file system to produce a new checksum and compare the new checksum to the respective checksum from the archive data structure; and copy, by each worker process, data from archive data files of the archive data structure associated with the particular batch of entries to directories and files on the destination file system to extract the archive data files to the destination file system.

10. The non-transitory computer-readable medium of claim 9, wherein the executable code further causes the at least one processor to:

identify, by each worker process, modified files and directories included in the archive data structure associated with the particular batch of entries; and repack, by each worker process, the modified files into a new archive data file of the archive data structure.

11. The non-transitory computer-readable medium of claim 9, wherein the entries in the manifest file of the archive data structure are compressed.

12. The non-transitory computer-readable medium of claim 9, wherein the executable code further causes the at least one processor to launch a worker process for each batch of entries that is generated.

13. The non-transitory computer-readable medium of claim 9, wherein the metadata of each entry includes a file path and a file name.

14. The non-transitory computer-readable medium of claim 9, wherein the executable code further causes the at least one processor to decrypt and decompress the archive data files to copy the data from the archive data files to the destination file system.

15. The non-transitory computer-readable medium of claim 9, wherein the executable code further causes the at least one processor to validate checksums of the archive data files and correct any corrupt data using parity to copy the data from the archive data files to the destination file system.

16. The non-transitory computer-readable medium of claim 9, wherein the archive data structure includes a summary file with a checksum for each archive data file in the archive data structure.

17. A system, comprising:

a memory containing a computer-readable medium comprising machine executable code having stored thereon instructions; and at least one processor coupled to the memory, the at least one processor configured to execute the machine executable code to cause the at least one processor to:

read, by a scanner, entries in a manifest file of an archive data structure to generate at least one batch of entries for at least one worker process, the archive data structure including the manifest file and packed archive data files archived from a source file system, the archive data structure including checksums for the archive data files in the archive data structure;

compare, by each worker process, metadata of each entry of a particular generated batch of entries to a destination file system to verify the particular batch of entries, wherein the metadata includes a file path and a file name;

read and re-checksum data from a target file of the destination file system to produce a new checksum and compare the new checksum to the respective checksum from the archive data structure; and copy, by each worker process, data from archive data files of the archive data structure associated with the particular batch of entries to directories and files on the destination file system to extract the archive data files to the destination file system.

18. The system of claim 17, wherein the machine executable code further causes the at least one processor to:

identify, by each worker process, modified files and directories included in the archive data structure associated with the particular batch of entries; and repack, by each worker process, the modified files into a new archive data file of the archive data structure.

19. The system of claim 17, wherein the machine executable code further causes the at least one processor to decrypt and decompress the archive data files to copy the data from the archive data files to the destination file system.

20. The system of claim 17, wherein the machine executable code further causes the at least one processor to validate checksums of the archive data files and correct any corrupt data using parity to copy the data from the archive data files to the destination file system.

* * * * *